Patented June 29, 1948

2,444,269

UNITED STATES PATENT OFFICE 2,444,269

LIGHT STABILITY OF PETROLEUM WAXES

Joseph Phillips, Petrolia, Pa., assignor to L. Sonneborn Sons, Inc., a corporation of Delaware No Drawing. Application February 26, 1947,
Serial No. 731,057

19 Claims. (Cl. 196—17)

1

This invention relates to new and useful improvements in the light stability of petroleum waxes.

Petroleum waxes, such as petrolatum, microcrystalline waxes or any other paraffinic type wax derived from petroleum when in substantially color refined condition possess considerable light sensitivity giving rise to darkening and thus to deterioration of the product.

Where reference is made herein to petroleum wax or such similar expression it is intended to designate thereby any petroleum derived paraffinic wax regardless of whether the same contains residual oil or is substantially oil free.

One object of the invention comprises inter alia a method for substantially stabilizing a substantially color refined petroleum wax against deterioration caused by exposure to light.

Another object of the invention comprises a substantially color refined petroleum wax which is substantially stable against deterioration caused by exposure to light.

These and other objects of the invention will appear from the following description:

The petroleum wax product, substantially resistant to light deterioration in accordance with the invention, essentially comprises a substantially color refined, normally light sensitive petroleum wax of a preferred Lovibond color not exceeding 5R and preferably not exceeding 5Y-O-R, and an extract derived from the extraction of the predominantly aromatic components from a petroleum oil distillate with an aromatics extracting agent, i. e., an agent of the type capable of separating predominantly aromatic components from such distillate, said extract being present in said product in amount sufficient to impart thereto substantially permanent light stability and preferably not in excess of the amount which substantially imparts to said product an appreciable degradation in Lovibond color value for said product in excess of 5R and for the preferred product in excess of 5Y-O-R.

All color values referred to herein are expressed in accordance with the Lovibond scale (2 inch cell, unless otherwise indicated).

The extract useful in accordance with the invention may be obtained from any petroleum oil distillate by extracting the same with an extracting agent capable of separating from such distillate its substantially aromatic components. Such extracting material or agent may be any suitable organic solvent capable of dissolving aromatic materials or may be a suitable adsorbent capable of extracting from such distillate its pre-

2 dominantly aromatic components. Suitable organic solvents are, for instance, dichlorethylether, dichlorisopropylether, dichlorbutylether, furfural, phenol, nitrobenzene, acetone, methylethylketone, liquid sulfur-dioxide, as such or in combination with benzol cresylic acid and similar phenolic homologues. The foregoing solvents are merely representative and illustrative of a large number of suitable solvents well known and conventionally used for aromatics extraction in the selective solvent refining of petroleum oil distillates, substantially leaving behind the paraffinic constituents in the form of a raffinate. Conventional selective solvent extracts from petroleum oil distillates, therefore, constitute a convenient source for the extract material useful in accordance with the invention.

A satisfactory adsorbent for obtaining the aromatics extract capable of imparting substantial light stability to petroleum waxes in accordance with the invention, may be any suitable adsorbent conventionally used in the selective aromatic component extraction or removal from petroleum oil distillates in the well known filtration refining of such distillates. Selective adsorbent refining is normally practiced as an alternative or as an adjunct to selective solvent refining, the adsorbent in this case being selective with respect to the removal of aromatic constituents to obtain predominantly paraffinic constituents by way of the raffinate. In conventional operations, the material extracted by the selective adsorbent is recovered by the use of a suitable solvent or stripping agent therefor, which is preferably not substantially adsorbed by the adsorbent. Solvents or stripping agents conventionally known and used for aromatics extract stripping purposes from selective adsorbents are, for instance, petroleum naphtha and similar low-boiling aliphatic petroleum solvents, benzol, acetone and such mutual solvent systems as benzol-alcohol, steam-gasoline, benzol-acetone and ethylmethylketone, and in general mutual solvent systems which include at least one polar and one non-polar solvent. Extracting agents of the selective adsorbent type conventionally used in the adsorbent refining of petroleum oil distillates are, for example, fuller's earth, various clays, bauxite, kieselguhr, magnesite, silica gel, diatomaceous earth and others.

The solvent solution of the extract as it is obtained either by way of selective solvent extract solution or by way of solvent solution derived from the solvent stripping of a selective adsorbent is then worked up by removing the solvent, such as by distillation. The resulting aromatics extract constitutes a relatively dark mass varying in consistency or viscosity primarily dependent upon its origin. At normal temperature the extract is normally from syrupy-viscous to relatively fluid but may be substantially solid. It may be used as such, if desired, by incorporating the same into the desired wax. In most cases, however, the relatively very dark color of the material will thereby impart to the wax an undesirably high degradation in color value.

This may not be necessarily material for the lesser quality products but for higher quality waxes it is preferred to improve the color characteristics of the extract prior to adding the same to the wax in order to essentially preserve the color value of the refined wax and not to degrade the same too much by the addition of the unrefined extract. For this reason I prefer to subject the extract to suitable refining such as by distillation, steam distillation, superheated steam distillation or the like. For best results thermal-cracking conditions to any appreciable extent are to be avoided in the refining of the extract and for this reason when substantially dry-distilling, in vacuo distillation is preferred. When adding the unrefined extract, particularly when compounding a semi-refined product, the resultant component color value is relatively dark. Within the scope of the invention, however, such component color value not exceeding 5R constitutes still in many cases a usable commercial product. In the majority of cases, however, it is preferred to have a final product possessing a Lovibond color substantially not in excess of 5Y-O-R. For the preparation of such a product an unrefined extract is ordinarily not usable even with a maximum refined wax product. Dependent upon the source of the extract it may be necessary to either fractionate the same so as to obtain a given relatively light colored fraction or to redistill one or more times selected portions of the overhead for the same purpose. By such suitable procedures it is then possible to procure a refined extract having color characteristics which when compounding the extract with the wax will yield a product, the final Lovibond color value of which is within the desired limits. Refining per se of the extract does not ordinarily affect the light stabilizing potency of the same. The overhead or redistilled overhead or any fraction thereof are also ordinarily of about equal potency though differing in color characteristics.

Effective amounts of the extract useful in accordance with the invention may vary dependent upon the source of the extract and the extractant used. In general using the same source of distillate, a selective solvent derived extract is usually more potent than a selective adsorbent derived extract. Whereas in some cases satisfactory results may be obtained by as low as ½% of extract by weight of wax, it takes in most cases of selective solvent derived extracts in the order of about 1% by weight of the wax to accomplish the desired result. Using a selective adsorbent derived extract, amounts of extract in the order of about 1% to as high as about 5% by weight of the wax, may be necessary to effect the desired improvement in light stability. The color value of a particular refined or semi-refined wax product with which the extract is compounded in accordance with the invention is not critical except insofar as it determines the ultimate color value of the final product which will become substantially fixed or stabilized by the addition of the refined extract.

Light stability within the scope of this invention is measured by light exposure tests involving exposure of samples of the wax or petrolatum to ultra violet light radiation, such as are emitted by a suitable light source with an emission spectrum of the order of at least 85% of the total wattage radiation having a wave length of a magnitude of at least 3800 angstrom units. A convenient light source for this purpose is, for instance, a conventional ultra violet light or "sun" lamp, such as the S-1 General Electric Mazda lamp.

A representative spectrum of such a light source is, for example, one conforming to the following characteristics: Total watt 400; below 2800 A.—.002% watt; 2800–3200 A.—0.8% watt; 3200–3800 A.—1.1% watt; 3800–5000 A.—2.05% watt; 5000–6000 A.—2.3% watt; 6000–7600 A.—6.8% watt; total ultra violet below 3800 A. is 1.95% watt.

The test is conducted by exposing 2 oz. samples of the wax in cylindrical glass cells substantially transparent to ultra violet light. These cells are about 1½" diameter and about 2½" height. One or more thereof are secured (multiple cells preferably not exceeding four in number are axially aligned in end-to-end position) within a rotatable frame or cage in substantially co-axial alignment as to the substantially horizontally disposed axis of rotation of the cage. The ultra violet light or sun lamp is centrally positioned on a vertical to the axis of rotation of the cage at a distance of about 23" (plus or minus) between the bottom of the lamp and the axis of rotation. During exposure the cage is slowly rotated about its axis to insure uniform distribution of the incident radiation. The exposed samples are withdrawn after about six hours' exposure and examined for color degradation. Six hours' exposure to the light source under the conditions of test stated is equivalent to about six hours' exposure to direct sunlight of an intensity equivalent to that at about noon on an average July day, or, is equivalent to about 30 hours' exposure to diffused daylight at about noon on an average sunny July day. Experience has demonstrated that whatever light-induced deterioration is effected reaches substantially its maximum within six hours of exposure to direct sunlight or 30 hours' exposure to diffused daylight of the intensity just mentioned and practically no further appreciable degradation occurs upon exposure to such light beyond these periods. Discoloration immunity for at least six hours' direct sunlight exposure (or equivalent radiation such as set forth in the above test) is therefore considered for practical purposes a substantially permanent immunity to light-induced color degradation.

The predominantly aromatic extracts used in accordance with the invention exercise a light-screening or filtering action upon the petroleum wax with which they are compounded. This is, for instance, demonstrated in Example I in which a petroleum wax, such as a microcrystalline wax, when subjected to a light sensitivity test by exposure to ultra violet radiation while encased in mineral white oil, exhibits a normal light exposure deterioration, whereas a sample of the same wax similarly exposed, but encased in a mineral white oil containing dissolved therein an effective amount of an aromatics extract usable in accordance with the invention, shows complete absense of light deterioration.

EXAMPLE I

A 2 oz. sample of white microcrystalline wax having a melting point of 150° F., an A. S. T. M. needle penetration of 40 and a Lovibond color of ½Y was introduced into a small vial essentially transparent to ultra violet radiation. The vial was then sealed and centered inside of a 4 oz. cylindrical glass bottle essentially transparent to ultra violet radiation. The bottle was then filled with fully refined mineral white oil containing dissolved therein 1% of a vacuum distillation refined extract. This extract was obtained by conventional furfural countercurrent extraction of a Gulf Coast distillate and the subsequent removal of the furfural leaving an extract material of a specific gravity of 0.9668, Saybolt viscosity at 100° F. of 163.5 seconds, flash point of 320° F., and fire point of 370° F. This extract was then subjected to vacuum distillation at a still pressure of 5 millimeters and a bottom temperature of 240° F., yielding about 20% color of 35Y 1½R, the balance of the overhead being of darker color. The addition of 1% of the lighter colored distillate fraction of the extract to the white oil did not appreciably change its original color value of O–Y–O–R; the Lovibond color value of the extract white oil solution was about ½Y–O–R.

Another sample of the same white microcrystalline wax was introduced into a similar vial, which was sealed and centered in a 4 oz. cylindrical bottle as described above in connection with the extract compounded sample, the bottle in this case being filled with the same mineral white oil but without the extract.

The two test specimens were then exposed to ultra violet radiation in the device and under the conditions hereinabove specified to simulate direct sunlight exposure. After six hours' light exposure the samples were removed. The sample surrounded by the mineral white oil containing in solution 1% of the extract had retained its initial color of about ½Y. The blank test sample, i. e., the one surrounded by the mineral white oil without extract, had become discolored showing a degraded color value of 4½Y 1R showing that in this case ultra violet radiation had penetrated the surrounding white oil bath to effect color degradation of the wax sample, whereas in the case of the first mentioned test sample, ultra violet radiation was effectively screened from reaching the wax sample, thereby leaving the same substantially unaffected.

The following examples are furnished by way of illustration and not of limitation of various products compounded in accordance with the invention, using extracts obtained from various sources and by way of various extractants.

EXAMPLE II 100 parts by weight of the same white microcrystalline wax of Lovibond color value ½Y specified in Example I was melted and one part by weight of the same refined Gulf Coast distillate derived extract specified in Example I was dissolved in the wax. The compounded product had a substantially unchanged Lovibond color value of about ½Y.

A 2 oz. sample of the compounded product was then subjected to ultra violet radiation in simulaton of direct sunlight exposure in the manner hereinabove specified. At the same time a 2 oz. blank sample of the same wax without the extract was subjected to the exposure test. The color value of the blank test sample, i. e., without extract, was ½Y and the Lovibond color value of the extract compounded sample was ½Y. The samples were withdrawn after six hours' exposure and examined for Lovibond color values. The blank sample showed appreciable darkening to a Lovibond color value of 6½Y 1½R, whereas the extract compounded sample showed a substantially unchanged color value of ½Y.

EXAMPLE III

An extract was used derived from conventional counter-current $SO_2$-benzol extraction of a California distillate. This extract after removal of extracting solvent substantially possessed a specific gravity of .9979, a Saybolt viscosity at 100° F. of 2600, a flash point of 500° F. and a fire point of 575° F. The product was steam-distilled and an overhead fraction having a Lovibond color value of 25Y 1R was separated.

100 parts by weight of the same white microcrystalline wax used in the preceding examples and having a Lovibond color value of ½Y was melted and one part by weight of the aforementioned steam-distilled extract fraction was dissolved therein, giving a color value for the compounded product of 1Y. The sample was subjected to the same ultra violet radiation exposure test hereinabove mentioned and specified in the preceding examples and examination for color value after exposure for six hours showed the original color value of 1Y of the compounded product to have remained substantially constant.

EXAMPLE IV

Solvent-stripped extracts were obtained respectively from the conventional counter-current dichlorethylether extraction of a Mid-Continent distillate, the conventional counter-current dichlorethylether extraction of a Pennsylvania neutral distillate, the conventional counter-current furfural extraction of a Pennsylvania neutral distillate, and the conventional counter-current benzol-cresylic acid extraction (conventionally known as the duosol process) of a Pennsylvania neutral distillate. The extracts respectively possessed the characteristics set forth in columns 2–5 (a–e) of the below table.

The various extracts were refined by vacuum distillation and in each case the lightest colored fractions were separated; the color values of these overhead fractions of the respective extracts are also set forth in columns 2–5 (f) of the below table.

Individual samples of 100 parts by weight each of the same white microcrystalline wax of a Lovibond color value of ½Y used in the preceding examples were respectively compounded in molten condition with one part by weight of these overhead distillate fractions. In each case the resultant wax-extract product had a compounded Lovibond color of about 1Y O–R. Upon exposure to ultra violet radiation in the apparatus and under the conditions of test herein specified in simulation of direct sunlight exposure, each of the samples examined for Lovibond color valuation showed a substantially unchanged Lovibond color after the six hours' exposure.

EXAMPLE V

An extract obtained from the conventional counter-current dichlorethylether extraction of a Pennsylvania neutral was used. This extract possessed the characteristics shown in column 3 (a–e) of the below table.

100 parts by weight of the same microcrystalline wax specified in the preceding examples and having a Lovibond color value of ½Y was melted and compounded with one part by weight of the solvent-stripped unrefined extract. The resultant product had a compounded Lovibond color value of about 6Y. The sample was subjected to the ultra violet radiation exposure test specified in the preceding examples and examination after six hours' exposure showed that the Lovibond color value of the sample was substantially unchanged.

EXAMPLE VI

Samples were prepared of a compounded wax using the extracts and amounts thereof specified in Example IV, but using in this case a microcrystalline wax having a melting point of 140° F., a needle penetration of 60 and a Lovibond color of 2Y. Using the refined distillate fractions of the extracts as specified in Example IV, the compounded wax samples all possessed a Lovibond color value of about 2½Y O–R. Upon exposure to ultra violet radiation in the apparatus and under the conditions of test herein specified, each of the samples examined after six hours showed a substantially unchanged Lovibond color valuation. A blank sample of the wax, i. e., without any extract, when subjected to the ultra violet radiation test showed, after six hours' exposure, a deteriorated Lovibond color value of about 8Y 1½R.

EXAMPLE VII

Samples were prepared of a compounded product using the extracts and amounts thereof specified in Example IV but using in this case, in one set of samples, a white petrolatum having a melting point of 118° F., an A. S. T. M. penetration of 170 and a Lovibond color of 2Y, and in a second set of samples, a white petrolatum having a melting point of 118° F., an A. S. T. M. penetration of 170 and a Lovibond color value of 3Y. The compounded samples of the first set had a Lovibond color value of 2½Y O–R and that of the second set 3½Y O–R. All the samples when exposed to ultra violet radiation in accordance with the apparatus, procedure and test conditions herein specified, showed upon six hours' exposure, a substantially unchanged Lovibond color value. Blank tests using the 2Y and the 3Y petrolatum without addition of any extract showed, when subjecting the samples to ultra violet radiation for six hours, deteriorated Lovibond color values of 8Y 1½R and 9Y 1½R respectively.

EXAMPLE VIII

Samples were prepared of a compounded product using the extracts and amounts thereof specified in Example IV but using in this case an amber petrolatum having a melting point of 116° F., an A. S. T. M. penetration of 160, and a Lovibond color of 35Y 4R. The addition of the extract in each case did not observably change the color value of the wax. Samples were subjected to ultra violet radiation as specified in accordance with the preceding examples and after six hours exposure showed the Lovibond color values to have remained substantially unchanged. A sample of the amber petrolatum without any extract added was subjected to the ultra violet radiation test and showed after exposure of six hours, a deteriorated Lovibond color value of 35Y 9R.

EXAMPLE IX

Samples were prepared of a compounded product using the extracts and amounts thereof specified in Example IV but using in this case a yellow microcrystalline wax having a melting point of 150° F., a needle penetration of 40, and a Lovibond color value of 35Y 2R. After compounding with the various extracts the Lovibond color value of the samples was not observably changed. The samples when subjected to ultra violet radiation for six hours in accordance with the test and conditions herein specified showed a substantially unchanged Lovibond color value. A test sample of the yellow wax subjected to the ultra violet radiation exposure test for six hours but not compounded with any extract showed a Lovibond color deterioration to 35Y 8R.

EXAMPLE X

A selective adsorbent extract was prepared by filtering a raw Pennsylvania neutral distillate of 34 A. P. I. gravity through activated bauxite in the conventional manner until substantial exhaustion of the adsorption capacity of the filter material. The filter material was then intimately contacted with gasoline, permitting the same to thoroughly soak in. Steam was then passed through the gasoline-charged filter material recovering a gasoline solution of aromatics extract. This gasoline solution was then stripped of solvent by suitable vacuum distillation obtaining the aromatics extract which possessed a melting point of 113° F., a Saybolt viscosity at 210° F. of 75 seconds, a flash point of 420° F., a fire point of 460° F. and an A. S. T. M. penetration of 190. The extract was subjected to super-heated steam distillation at a bottom temperature of about 300° F.; the lightest colored overhead fraction resulting from the extract distillation had a Lovibond color of about 20Y 2R.

A series of samples was prepared using the white microcrystalline wax specified in Examples I to V, having a Lovibond color of ½Y, the white microcrystalline wax having a Lovibond color of 2Y specified in Example VI, the white petrolatum wax specified in Example VII having the respective color values of 2Y and 3Y, the amber petrolatum specified in Example VIII having the color value 35Y 4R and the yellow microcrystalline wax specified in Example IX having the color value 35Y 2R.

100 parts by weight of each of these waxes were each compounded with 5 parts by weight of the above prepared distillate fraction; the compounded Lovibond color values of the respective products were about 1¼Y–2¾Y–2¾Y and 3¾Y respectively for the waxes having originally no "red" (R) units. No observable color change was exhibited by the two darker colored waxes.

Each of the samples was subjected to ultra violet radiation exposure in the manner set forth in accordance with the preceding examples and when examined after six hours for Lovibond color values was found to have a substantially unchanged color value.

EXAMPLE XI

A selective adsorbent extract was prepared by filtering the same Pennsylvania neutral specified in the preceding example through fuller's earth in the conventional manner until substantial exhaustion of the adsorbent. A mixture of equal volumes of benzol and alcohol was then passed through the filter material, thereby stripping it from its adsorbed aromatics content. After removal of the solvent from the filtrate by distillation, the resultant aromatics extract possessed substantially the same characteristics as those of the extract obtained in accordance with the preceding example. The extract was distilled in the same manner as set forth in the preceding example, recovering the lightest colored overhead fraction of 35Y 4R. Compounding the same waxes with this extract in the same amounts specified in the preceding examples gave substantially the same results there set forth. In each case the compounded color values remained substantially unchanged after six hours' exposure to ultra violet radiation in the manner set forth.

EXAMPLE XII

A selective adsorbent extract was prepared by filtering a Pennsylvania cylinder stock (150 seconds Saybolt at 210° F.) through activated bauxite in the conventional manner to conventional bright stock specifications, i. e., a viscosity of about 150 seconds Saybolt at 210° F., Conradson carbon test of 0.5% and Lovibond color of about 35Y 6R (½" cell). Filtration was continued until exhaustion of filter material and the latter was then stripped of its aromatics extract content by superheated steam-gasoline treatment as prescribed in connection with Example X. After removal of the gasoline by vacuum distillation, the resulting extract was substantially solid at ordinary temperature and had the following characteristics: A melting point of about 122° F., a Saybolt viscosity at 210° F. of 160 seconds, a flash point of 600° F., a fire point of 650° F. Vacuum distillation of the extract at about 5 millimeters' pressure and a bottom temperature of approximately 350° F. yielded a relatively light colored fraction (third overhead), having a Lovibond color value of about 35Y 2R.

Samples were prepared using respectively the white microcrystalline wax specified in Examples I to V having a Lovibond color of ½Y, the white microcrystalline wax specified in Example VI having a Lovibond color value of 2Y, the white petrolatum products specified in Example VII having respectively the color values of 2Y and 3Y, the amber petrolatum specified in Example VIII having the Lovibond color value of 35Y 4R and the yellow microcrystalline wax specified in Example IX having a Lovibond color value of 35Y 2R. These samples were each compounded in amounts of 100 parts by weight with 5 parts by weight of the distilled extract obtained as above set forth. The compounded Lovibond color values of the resultant extract-containing wax products were substantially the same as those set forth for the compounded products specified in Example X.

The various samples were then subjected to ultra violet radiation exposure tests under the conditions and in the manner set forth in the preceding examples. After six hours' exposure each sample was examined and showed substantially unchanged Lovibond color value.

The foregoing specific description is for purposes of illustration and not of limitation and it is therefore my intention that the invention be limited only by the appended claims or their equivalents wherein I have endeavored to claim broadly all inherent novelty.

I claim:

1. A petroleum wax product substantially resistant to deterioration by exposure to light, which comprises a substantially color refined normally substantially light sensitive petroleum wax and an extract derived from the extraction of a petroleum oil distillate with a selective aromatics extractant, said extract being present in said product in amount sufficient to impart thereto substantially permanent light stability.

2. A petroleum wax product in accordance with claim 1 in which said extract is one derived from the selective solvent extraction of a petroleum oil distillate with a selective aromatics solvent.

3. A petroleum wax product in accordance with claim 2 in which said normally light sensitive petroleum wax has a Lovibond color substantially not exceeding 5R and in which said extract is present not in excess of the amount imparting to said product substantially a Lovibond color degradation to in excess of 5R.

4. A petroleum wax product in accordance with claim 2 in which said normally light sensitive petroleum wax has a Lovibond color substantially not exceeding 5Y O-R and in which said extract is present not in excess of the amount imparting to said product substantially a Lovibond color degradation to in excess of 5Y O-R.

5. A petroleum wax product in accordance with claim 4 in which said normally light sensitive petroleum wax is a microcrystalline wax.

6. A petroleum wax product in accordance with claim 4 in which said normally light sensitive petroleum wax is a petrolatum.

7. A petroleum wax product in accordance with claim 1 in which said extract is one derived from the selective adsorbent extraction of a petroleum oil distillate with a selective aromatics extracting adsorbent.

8. A petroleum wax product in accordance with claim 7 in which said normally light sensitive petroleum wax has a Lovibond color substantially not exceeding 5R and in which said extract is present not in excess of the amount imparting to said product substantially a Lovibond color degradation to in excess of 5R.

9. A petroleum wax product in accordance with claim 7 in which said normally light sensitive petroleum wax has a Lovibond color substantially not exceeding 5Y O-R and in which said extract is present not in excess of the amount imparting to said product substantially a Lovibond color degradation to in excess of 5Y O-R.

10. A petroleum wax product in accordance

TABLE

*Properties of extracts*

| | | 1 | 2 | 3 | 4 | 5 |
|---|---|---|---|---|---|---|
| | Source of Extract | | Mid-Continent | Pa. Neutral | Pa. Neutral | Pa. Neutral |
| a | Extractant | | Dichlorethylether | Dichlorethylether | Furfural | Benzol Cresylic Acid. |
| b | Sp. Gr. | | .9554 | .9718 | .9813 | .9745. |
| c | $V_s$ 100 | | 825 | 825 | 2794 | 1407. |
| d | $V_s$ 210 | | 55 | 56 | 90 | 67. |
| e | Flash Point | | 405 | 420 | 430 | 430. |
| f | Fire Point | | 465 | 470 | 480 | 485. |
| | Color Value of Lightest Colored Fraction of Overhead Distillate. | | 35Y1¼R | 35Y1R | 35Y1½R | 35Y1½R. | with claim 9 in which said normally light sensitive petroleum wax is a microcrystalline wax.

11. A petroleum wax product in accordance with claim 9 in which said normally light sensitive petroleum wax is a petrolatum.

12. Method for substantially stabilizing a color refined normally light sensitive petroleum wax against deterioration by exposure to light which comprises compounding with such a wax an extract, derived from the extraction of a petroleum oil distillate with a selective aromatics extractant, in amount sufficient to impart thereto substantially permanent light stability.

13. Method for substantially stabilizing a color refined normally light sensitive petroleum wax against deterioration by exposure to light which comprises refining by distillation an extract derived from the extraction of a petroleum oil distillate with a selective aromatics extractant to thereby obtain a relatively light colored overhead and thereafter compounding with such a wax having a Lovibond color substantially not exceeding 5R, an amount of said overhead sufficient to impart to said wax substantially permanent light stability and insufficient to impart thereto substantially Lovibond color degradation to in excess of 5R.

14. Method in accordance with claim 13 in which said extract is one derived from the selective solvent extraction of a petroleum oil distillate with a selective aromatics solvent.

15. Method in accordance with claim 14 in which said normally light sensitive petroleum wax is a microcrystalline wax having a Lovibond color substantially not exceeding 5Y O–R and in which said wax is compounded with said extract in amount insufficient to impart thereto substantially a Lovibond color degradation to in excess of 5Y O–R.

16. Method in accordance with claim 14 in which said normally light sensitive petroleum wax is a petrolatum having a Lovibond color substantially not exceeding 5Y O–R and in which said wax is compounded with said extract in amount insufficient to impart thereto substantially a Lovibond color degradation to in excess of 5Y O–R.

17. Method in accordance with claim 13 in which said extract is one derived from the selective adsorbent extraction of a petroleum oil distillate with a selective aromatics extracting adsorbent.

18. Method in accordance with claim 17 in which said normally light sensitive petroleum wax is a microcrystalline wax having a Lovibond color substantially not exceeding 5Y O–R and in which said wax is compounded with said extract in amount insufficient to impart thereto substantially a Lovibond color degradation to in excess of 5Y O–R.

19. Method in accordance with claim 17 in which said normally light sensitive petroleum wax is a petrolatum having a Lovibond color substantially not exceeding 5Y O–R and in which said wax is compounded with said extract in amount insufficient to impart thereto substantially a Lovibond color degradation to in excess of 5Y O–R.

JOSEPH PHILLIPS.

REFERENCES CITED

The following references are of record in the file of this patent:

UNITED STATES PATENTS

| Number | Name | Date |
| --- | --- | --- |
| 2,035,418 | Archibald | Mar. 24, 1936 |
| 2,195,659 | Shoemaker | Apr. 2, 1940 |
| 2,325,085 | Vore | July 27, 1943 |
| 2,374,127 | Peterson | Apr. 17, 1945 |

Certificate of Correction

Patent No. 2,444,269.

June 29, 1948.

JOSEPH PHILLIPS

It is hereby certified that error appears in the printed specification of the above numbered patent requiring correction as follows: Column 5, line 22, after "20%" insert *overhead fraction (third overhead) having a*; and that the said Letters Patent should be read with this correction therein that the same may conform to the record of the case in the Patent Office.

Signed and sealed this 7th day of September, A. D. 1948.

[SEAL]

THOMAS F. MURPHY,
*Assistant Commissioner of Patents.*